April 22, 1941.   C. H. NAUERT   2,239,369
REFRIGERATOR
Filed July 22, 1937   2 Sheets-Sheet 1
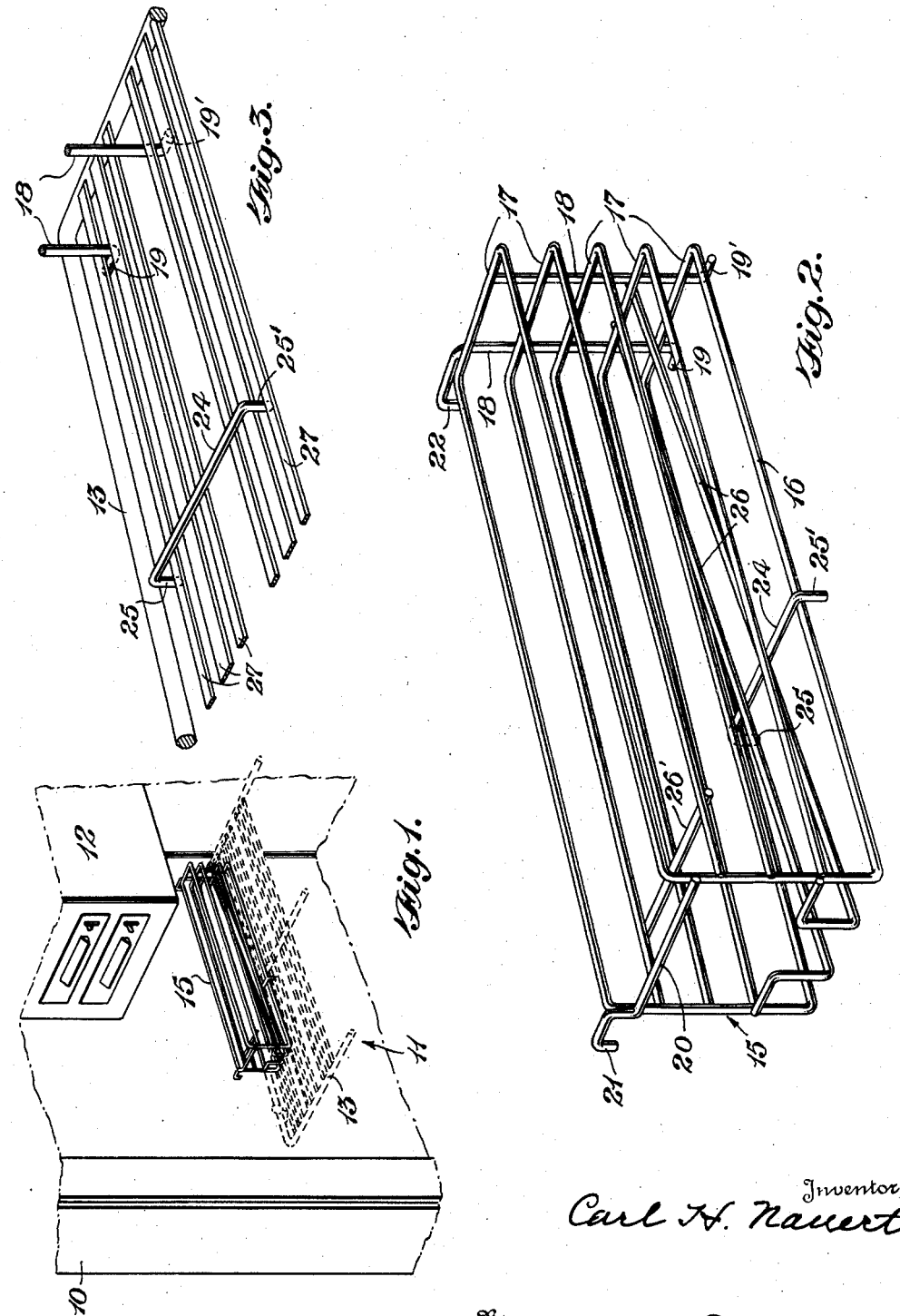
Inventor
Carl H. Nauert
By
Attorney

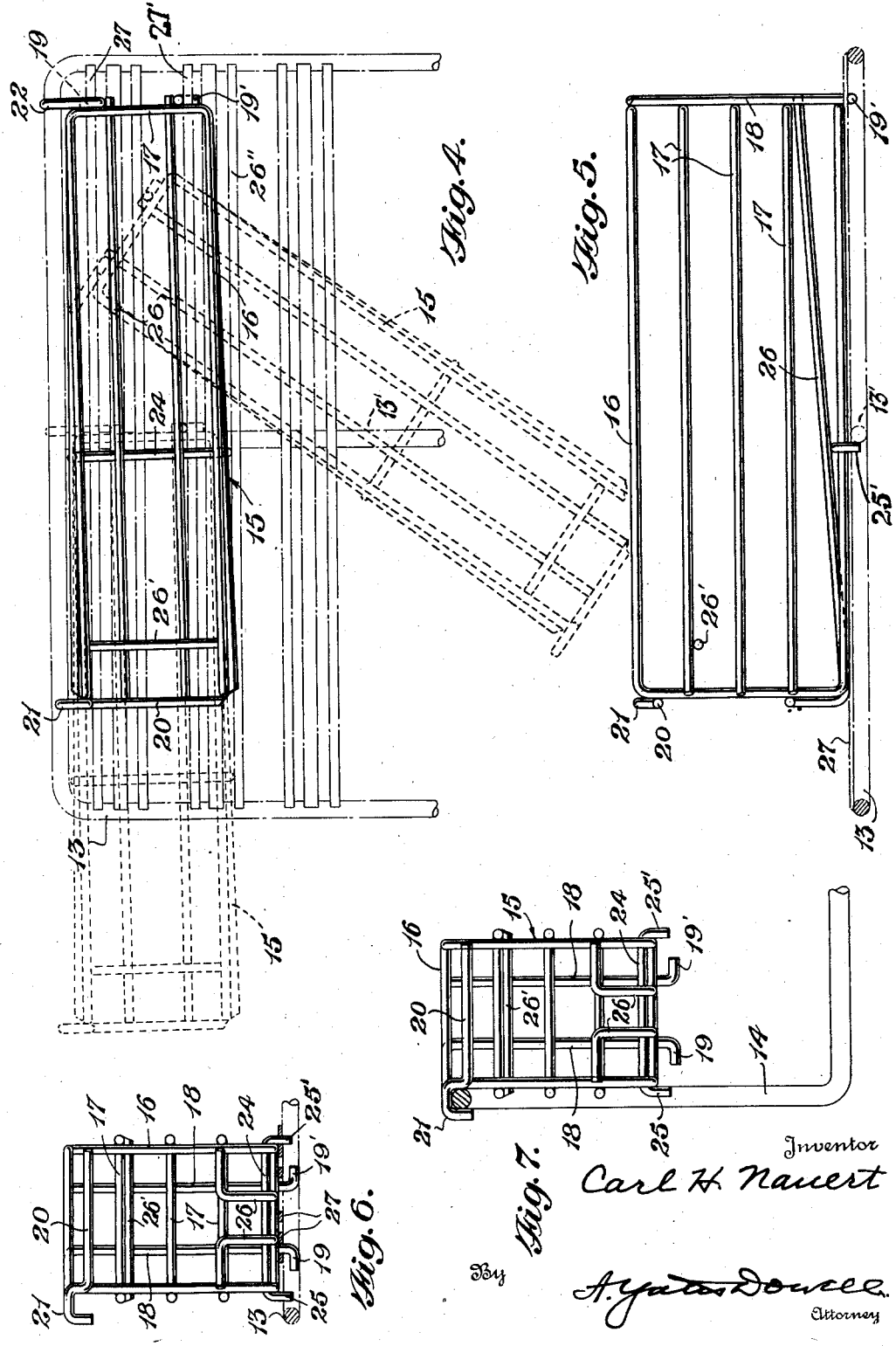

Patented Apr. 22, 1941

2,239,369

UNITED STATES PATENT OFFICE 2,239,369

REFRIGERATOR

Carl H. Nauert, Evansville, Ind., assignor to Servel, Inc., New York, N. Y., a corporation of Delaware Application July 22, 1937, Serial No. 155,094

6 Claims. (Cl. 211—13)

This invention relates to refrigeration and more particularly to a basket for holding eggs and analogous objects adapted to be disposed within a refrigerator cabinet of the household type. The improved egg basket is so constructed that it may be supported on a shelf within the refrigerator cabinet in sliding relation thereto or it may be supported on the edge of a container or other supporting means within the refrigerator.

It is an object of the invention to provide a basket for eggs and analogous objects which may be mounted in conjunction with a shelf or like support in a refrigerator cabinet in a manner such as will render the contents of the basket conveniently accessible at all times.

It is a further and more specific object of the invention to provide an egg basket or container which may be mounted on a shelf or within another larger container within a refrigerator, the egg basket being provided with means by which it may be supported for sliding engagement with the shelf or from one of the upper side walls of the larger container in which it may be placed so that the basket may be readily withdrawn for removal of its contents, the construction of the basket per se being such as to further facilitate such removal.

Other objects and the nature and advantages of the invention will be apparent from the following description taken in conjunction with the accompanying drawings, wherein:

Figure 1 is a fragmentary perspective view of a refrigerator depicting an embodiment of my invention;

Figure 2 is a view in perspective of the egg basket or rack;

Figure 3 is a fragmentary view in perspective of a portion of a refrigerator shelf and the shelf engaging means of the egg basket or rack;

Figure 4 is a top plan view of the shelf having the invention applied thereto; illustrated by dotted lines is an angle of application and in broken lines the full installed position of the basket;

Figure 5 is a side elevation of the egg rack;

Figure 6 is an end elevation;

Figure 7 is also an end elevation but, here, is illustrated the structure by which suspension of the egg basket is effected within a larger container which may be disposed within the refrigerator.

Referring to Figure 1, an insulated refrigerator cabinet 10 is provided with a storage compartment 11 and a cooling unit 12 for refrigerating the same. Within the compartment 11 are mounted shelves 13 for supporting comestibles and the like to be preserved by refrigeration.

In order to maintain eggs in a readily accessible position within the compartment 11 a wire basket 15 is employed formed of longitudinal and transverse shaped wire rods, said rods being provided with bent end portions functioning as guide hooks for slidably engaging certain portions of the shelf and with additional hooks for suspension of the basket from the vertical side wall of a larger container 14 such as that partly shown in Fig. 7.

Referring to Figure 2, the wire basket 15 comprises a bent rod 16 forming generally a frame and transverse U-shaped guard rods 17 fastened thereto by suitable means such as welding, brazing, soldering, or other suitable means. Vertical rods 18 are fastened to the closed portions of the horizontal U-shaped rods 17 and have bent portions 19 and 19' at their lower ends serving as guide hooks. The horizontal bar 20 connecting two portions of the frame rod 16 has a hook-shaped end 21 and acts as a bracing bar for the egg basket structure. At the opposite corresponding end is provided a hook 22 for a similar purpose. At the lower part of the egg basket structure is provided an inclined track made up of rods 26 which rods are fastened at their ends to the frame rod 16 and which provide means for maintaining eggs at the front portion of the basket at all times when any are present within the basket. Attached to these inclined bars 26 is a cross member 24 having bent end portions 25 and 25'. This bar thus shaped functions as a combined brace, guide and stop means when the egg basket is mounted for sliding engagement with the bars of the shelf within the refrigerator. The type of shelf 13 illustrated in the drawings is provided with an intermediate cross bar 13' and the downwardly bent ends 25, 25' of the cross member 24 contact this bar and limit the rearward movement of the basket, while the end portions 19 and 19' contact said bar and limit the forward movement of the basket, note particularly Figure 5. A cross bar 26' connecting two legs of one of the U-shaped rods 17 serves as a brace for the egg basket and may also serve as a stop or other motion inhibiting means for the eggs.

The method of application of the egg basket to a shelf such as described and for sliding engagement therewith is clearly illustrated in Figure 4. The egg basket 15 is first applied to the shelf 13 as shown in dotted lines in Figure 4 with the end portion 19 engaging the first cross bar 27 from the side edge of the shelf 13. The other end portion 19' may then be brought into engaging position with the fourth cross bar 27' from the side of the shelf 13. Then the egg basket is moved to aligning position as shown in the full lines in order that end portions 25 of the cross bar 24 may fall into guiding position with respect to the cross bars 27 of the shelf 13 permitting sliding forward and backward of the egg basket on the shelf 13 as shown by the broken lines in Figure 4.

Figure 6 clearly discloses the egg basket 15 in fully installed position with respect to shelf 13 and showing end portions 19 and 19' and 25 and 25' in such relation to the cross pieces 27 of the shelf 13 that the egg basket may be pulled forward without fear of tilting and disalignment.

Figure 7 is a clear depiction of the egg basket in suspended position on one of the walls of the container 14, which may also be a basket.

Thus it is seen that applicant has provided a convenient means for the storing of eggs and other similar foodstuffs within a refrigerator cabinet, said means being easily and simply fabricated, yet making for much inherent utility and great flexibility of use.

It will be obvious to those skilled in the art that various changes may be made in this device without departing from the spirit of the invention and therefore the invention is not limited to what is shown in the drawings and described in the specification but only as indicated in the appended claims.

I claim:

1. For use in a refrigerator compartment having a shelf of open construction including horizontal members spaced laterally and extending longitudinally from front to back of the compartment and one or more laterally extending members, a removable basket-like container provided with upper and lower portions, and shelf engaging members maintaining said upper and lower portions in spaced relation and projecting downwardly from the container and terminating in laterally extending generally hook-shaped portions adapted for interlocking engagement with said horizontal longitudinal shelf members and operating to hold the container against substantial downwardly tilting movement when the container is drawn forwardly to a pulled out position beyond the front edge of the shelf, and means also projecting downwardly from the container operating to engage one of the laterally extending shelf members and limit the pulled out position of the container.

2. For use in a refrigerator compartment having a shelf of open-work construction including members spaced laterally and extending longitudinally from front to back of the compartment, a basket-like container having upper and lower portions and being adapted to be detachably and slidably supported on said shelf and having shelf engaging members maintaining said upper and lower portions in spaced relation and projecting downwardly therefrom and shaped in a manner such that they will be caused to pass between said longitudinal shelf members when the container is turned at an angle out of horizontal alignment with the shelf and will slidingly engage under said latter shelf members when the container is turned back into aligned or substantially aligned position with respect to the shelf, said shelf engaging members operating to hold the container against any substantial downward tilting movement when the container is drawn to a pulled-out position.

3. For use in a refrigerator compartment having a shelf of open construction including horizontal members extending longitudinally and laterally of the shelf, a removable basket-like container provided at its rear extremity with substantially rigid shelf engaging members projecting downwardly from the container and terminating in laterally extending generally hook-shaped portions, said portions being adapted to be brought into interlocking engagement with the longitudinally extending shelf members only by turning the container at an angle with respect to said latter members and then reversing the turn to bring the container back into alignment with the horizontal shelf members, said shelf-engaging members operating to hold the container against any substantial downward tilting movement when the container is drawn forwardly to a pulled-out position beyond the front edge of the shelf, and other downwardly projecting guide and stop members within the region of the front extremity of the container adapted to slidingly engage said longitudinal shelf members and assist in guiding the container and to also contact one of the laterally extending shelf members and limit the pulled-out position of the container.

4. For use in a refrigerator compartment having a shelf of open construction including horizontal members spaced laterally and extending longitudinally from front to back of the compartment and one or more laterally extending frame members, a basket-like container particularly adapted for round or rollable objects and having at the rear end thereof a pair of substantially rigid shelf-engaging members extending downwardly from the shelf with their free ends terminating in laterally extending generally hook-shaped portions adapted to engage under certain of the longitudinal shelf members only through turning the container at an angle with respect to the shelf to permit passage of said hooked ends between the longitudinal members and then reversing the turn to bring the container into substantial alignment with said longitudinal shelf members, said hook ends operating to hold the container against any substantial downwardly tilting movement when the container is drawn forwardly to a pulled-out position beyond the front edge of the shelf, and additional substantially straight downwardly projecting portions on said container disposed forwardly of said shelf engaging members and arranged to engage between certain of the longitudinally extending shelf members to assist in guiding the container and also contact one of said laterally extending shelf frame members when the container is drawn forwardly to a pulled-out position to limit said latter position.

5. A wire basket comprising a bent rod forming generally a frame including spaced upper and spaced lower portions, upright rod members serving to relatively support certain of said upper and lower portions of said frame, said upright rod members having their lower portions extended beneath the basket and terminating in hook portions for slidably fastening the basket to a shelf, and a cross member carried by said frame forwardly of said upright rod members and forming a combined brace, guide and stop for the basket when it is mounted for slidable engagement with the bars of the shelf within a refrigerator.

6. For use on a refrigerator shelf having longitudinal and transverse supports, a basket like receptacle for rollable objects adapted to be slidably mounted relative to the shelf, said basket-like receptacle having upper and lower portions, means maintaining said upper and lower portions in spaced relation and located on said receptacle adjacent its rear for hooking around a support and slidably confining the rear portion of the receptacle substantially to the plane of the shelf by permitting forward sliding movement of the receptacle relative to the shelf, means on said receptacle spaced forwardly of said first means and disposed transversely of the plane of said longitudinal and transverse supports in a manner to limit lateral movement of the receptacle but likewise permitting forward and backward sliding movement of the receptacle.

CARL H. NAUERT.